US005227253A

United States Patent [19]

Takasu et al.

[11] Patent Number: 5,227,253

[45] Date of Patent: Jul. 13, 1993

[54] RADIATION IMAGE STORAGE PANEL

[75] Inventors: Atsunori Takasu; Katsuhiro Kohda; Hideki Suzuki; Hisashi Yamazaki, all of Kanagawa, Japan

[73] Assignee: Fuji Photo Film Co., Ltd., Kanagawa, Japan

[21] Appl. No.: 864,715

[22] Filed: Apr. 7, 1992

[30] Foreign Application Priority Data

Apr. 8, 1991 [JP] Japan .................................. 3-103918
Apr. 9, 1991 [JP] Japan .................................. 3-104602

[51] Int. Cl.$^5$ ......................... B32B 9/00; B32B 19/00

[52] U.S. Cl. .................................... 428/690; 428/704; 428/917; 427/65; 427/157; 250/483.1; 252/301.4 F

[58] Field of Search ....................... 428/690, 704, 917; 422/65; 280/483.1; 252/301.4 F

[56] References Cited

U.S. PATENT DOCUMENTS 4,728,583 3/1988 Yamazaki et al. .................. 428/690
5,153,078 10/1992 Kojima et al. ........................ 427/65
5,164,224 11/1992 Kojima et al. ........................ 427/65

*Primary Examiner*—Patrick J. Ryan
*Assistant Examiner*—Elizabeth Evans
*Attorney, Agent, or Firm*—Sixbey, Friedman, Leedom & Ferguson

[57] ABSTRACT

A radiation image storage panel having a stimulable phosphor layer and an improved protective film is disclosed. The improved protective film is produced from a mixture of a film-forming resin and an oligomer having a polysiloxane skeleton or a perfluoroalkyl group. The improved protective film can be a coated layer containing a fluorocarbon resin which is soluble in an organic solvent. Otherwise, the improved protective film can be produced by coating on the phosphor layer a mixture of a film-forming resin composition containing a fluorocarbon resin which is soluble in an organic solvent, and a powdery resin of perfluoroolefin or silicone.

6 Claims, No Drawings

RADIATION IMAGE STORAGE PANEL

BACKGROUND OF THE INVENTION

1. Field of the Invention

This invention relates to a radiation image storage panel which is employable in a radiation image recording and reproducing method utilizing a stimulable phosphor.

2. Description of Prior Art

As a method replacing a conventional radiography, a radiation image recording and reproducing method utilizing a stimulable phosphor is described, for instance, in U.S. Pat. No. 4,239,968 and is practically used. In the method, a radiation image storage panel comprising a stimulable phosphor (i.e., stimulable phosphor sheet) is employed, and the method involves the steps of causing the stimulable phosphor of the panel to absorb radiation energy having passed through an object or having radiated from an object; sequentially exciting the stimulable phosphor with an electromagnetic wave such as visible light or infrared rays (hereinafter referred to as "stimulating rays") to release the radiation energy stored in the phosphor as light emission (stimulated emission); photoelectrically detecting the emitted light to obtain electric signals; and reproducing the radiation image of the object as a visible image from the electric signals. After the reproduction (reading) of the radiation image is completed, the remaining image is erased from the radiation image storage panel and the panel is stored for the next radiographic process, that is, the panel is generally used repeatedly after the recorded image is erased.

In the radiation image recording and reproducing method, a radiation image is obtainable with a sufficient amount of information by applying a radiation to an object at a considerably smaller dose, as compared with the conventional radiography using a combination of a radiographic film and a radiographic intensifying screen. Moreover, the radiation image recording and reproducing method is advantageous from the viewpoints of conservation of resources and economic efficiency because the radiation image storage panel can be repeatedly employed in the method, while the radiographic film is consumed for each radiographic process in the conventional radiography.

The radiation image storage panel employed in the above-described method generally comprises a support and a stimulable phosphor layer provided on one surface of the support. However, if the phosphor layer is self-supporting, the support may be omitted.

As the stimulable phosphor layer, there are known not only a phosphor layer comprising a binder and a stimulable phosphor dispersed therein but also a phosphor layer composed of only an agglomerate of a stimulable phosphor (not containing a binder), which is formed by deposition process or sintering process. Also known is a radiation image storage panel having other type of a stimulable phosphor layer in which voids of a stimulable phosphor agglomerate are impregnated with a polymer material.

In each of the above phosphor layers, the stimulable phosphor emits light (gives stimulated emission) when excited with an electromagnetic wave (stimulating rays) such as visible light or infrared rays after having been exposed to a radiation such as X-rays. Accordingly, the radiation having passed through an object or radiated from an object is absorbed by the phosphor layer of the panel in proportion to the applied radiation dose, and a radiation image of the object is produced in the panel in the form of a radiation energy-stored image. The radiation energy-stored image can be released as stimulated emission by sequentially irradiating the panel with stimulating rays. The stimulated emission is then photoelectrically detected to give electric signals, so as to reproduce a visible image from the electric signals.

On the free surface (surface not facing the support) of the phosphor layer is generally provided a film (i.e., protective film) to protect the phosphor layer from chemical deterioration or physical shock.

The protective film can be formed on the phosphor layer by coating the surface of the phosphor layer with a solution of a transparent organic polymer material such as a cellulose derivative or polymethyl methacrylate, and drying the coated solution. Alternatively, the protective film can be formed on the phosphor layer by beforehand preparing a film of an organic polymer material such as polyethylene terephthalate, or a transparent glass sheet, followed by placing and fixing it onto the phosphor layer with an appropriate adhesive. Otherwise, the protective film can be also formed by depositing an inorganic material on the phosphor layer.

Among the protective films prepared by the above-described various methods, the protective film formed by coating a solution for the formation of a protective film has such advantages that the bonding strength with the phosphor layer is high and the process for the formation of the protective film is relatively simple.

In the radiation image recording and reproducing method, the radiation image storage panel is repeatedly used in a cyclic procedure comprising the steps of exposure of the panel to a radiation (i.e., recording procedure of a radiation image), irradiation of the panel with stimulating rays (i.e., read-out procedure of the recorded radiation image), and irradiation of the panel with light for erasure (i.e., erasing procedure of the remaining radiation image). Transferring of the radiation image storage panel from one step to the subsequent step is conducted using a transferring means such as a belt or a roller, and the storage panel is generally piled on other panels to be stored after one cycle is finished. When the radiation image storage panel having a protective film formed by the above-mentioned coating method is repeatedly used as described above, the sensitivity of the panel is apt to lower little by little.

Since the radiation image recording and reproducing method is very useful for obtaining a radiation image as a visible image as described hereinbefore, it is desired for the radiation image storage panel employed in the method to have a high sensitivity and give an image of high quality (high sharpness, high graininess, etc.), as well as for the radiographic intensifying screen employed in the conventional radiography. Accordingly, it is very important to prevent the above-mentioned lowering (i.e., reduction) of the sensitivity of the radiation image storage panel.

As a coated protective film which is improved in the lowering of sensitivity of radiation image storage panels which is caused by the repeated use, Japanese Patent Provisional Publication No. 2(1990)-193100 (corresponding to U.S. patent application Ser. No. 07/704,738) describes a protective film of a fluorocarbon resin which is soluble in an organic solvent and is coated on a stimulable phosphor layer of a radiation image storage panel.

SUMMARY OF THE INVENTION

It is an object of the present invention to provide a radiation image storage panel improved in the lowering of its sensitivity which is caused in the repeated use of the radiation image storage panel through increase of abrasion on the surface of its protective film.

There is provided by the present invention a radiation image storage panel having a phosphor layer which comprises a stimulable phosphor, and a protective film, wherein the protective film is produced from a film-forming resin and an oligomer having a polysiloxane skeleton or a perfluoroalkyl group.

The invention also provides a radiation image storage panel having a phosphor layer which comprises a stimulable phosphor, and a protective film, wherein the protective film is produced by coating on the phosphor layer a mixture of a film-forming resin composition containing a fluorocarbon resin which is soluble in an organic solvent, and a particulate resin of perfluoroolefin or silicone.

DETAILED DESCRIPTION OF THE INVENTION

The radiation image storage panel of the invention is now described in more detail.

The stimulable phosphor of the phosphor layer of the panel of the invention is described below.

The stimulable phosphor, as described hereinbefore, gives stimulated emission when excited with stimulating rays after exposure to a radiation. From the viewpoint of practical use, the stimulable phosphor is desired to give stimulated emission in the wavelength region of 300–500 nm when excited with stimulating rays in the wavelength region of 400–900 nm.

Examples of the stimulable phosphor employable in the radiation image storage panel according to the invention include:

SrS:Ce,Sm, SrS:Eu,Sm, $ThO_2$:Er, and $La_2O_2S$:Eu,Sm;

ZnS:Cu,Pb, $BaO.xAl_2O_3$:Eu, in which x is a number satisfying the condition of $0.8 \leqq x \leqq 10$, and $M^{2+}O.xSiO_2$:A, in which $M^{2+}$ is at least one divalent metal selected from the group consisting of Mg, Ca, Sr, Zn, Cd and Ba, A is at least one element selected from the group consisting of Ce, Tb, Eu, Tm, Pb, Tl, Bi and Mn, and x is a number satisfying the condition of $0.5 \leqq x \leqq 2.5$;

$(Ba_{1-x-y},Mg_x,Ca_y)FX:aEu^{2+}$, in which X is at least one element selected from the group consisting of Cl and Br, x and y are numbers satisfying the conditions of $0 < x+y \leqq 0.6$ and $xy=0$, and a is a number satisfying the condition of $10^{-6} \leqq a \leqq 5 \times 10^{-2}$;

LnOX:xA, in which Ln is at least one element selected from the group consisting of La, Y, Gd and Lu, X is at least one element selected from the group consisting of Cl and Br, A is at least one element selected from the group consisting of Ce and Tb, and x is a number satisfying the condition of $0 < x < 0.1$;

$(Ba_{1-x},M^{II}_x)FX:yA$, in which $M^{II}$ is at least one divalent metal selected from the group consisting of Mg, Ca, Sr, Zn and Cd, X is at least one element selected from the group consisting of Cl, Br and I, A is at least one element selected from the group consisting of Eu, Tb, Ce, Tm, Dy, Pr, Ho, Nd, Yb and Er, and x and y are numbers satisfying the conditions of $0 \leqq x \leqq 0.6$ and $0 \leqq y \leqq 0.2$, respectively;

$M^{II}FX.xA:yLn$, in which $M^{II}$ is at least one element selected from the group consisting of Ba, Ca, Sr, Mg, Zn and Cd; A is at least one compound selected from the group consisting of BeO, MgO, CaO, SrO, BaO, ZnO, $Al_2O_3$, $Y_2O_3$, $La_2O_3$, $In_2O_3$, $SiO_2$, $TiO_2$, $ZrO_2$, $GeO_2$, $SnO_2$, $Nb_2O_5$, $Ta_2O_5$ and $ThO_2$; Ln is at least one element selected from the group consisting of Eu, Tb, Ce, Tm, Dy, Pr, Ho, Nd, Yb, Er, Sm and Gd; X is at least one element selected from the group consisting of Cl, Br and I; and x and y are numbers satisfying the conditions of $5 \times 10^{-5} \leqq x \leqq 0.5$ and $0 < y \leqq 0.2$, respectively;

$(Ba_{1-x},M^{II}_x)F_2.aBaX_2:yEu,zA$, in which $M^{II}$ is at least one element selected from the group consisting of Be, Mg, Ca, Sr, Zn and Cd; X is at least one element selected from the group consisting of Cl, Br and I; A is at least one element selected from the group consisting of Zr and Sc; and a, x, y and z are numbers satisfying the conditions of $0.5 \leqq a \leqq 1.25$, $0 \leqq x \leqq 1$, $10^{-6} \leqq y \leqq 2 \times 10^{-1}$, and $0 < z \leqq 10^{-2}$, respectively;

$(Ba_{1-x},M^{II}_x)F_2.aBaX_2:yEu,zB$, in which $M^{II}$ is at least one element selected from the group consisting of Be, Mg, Ca, Sr, Zn and Cd; X is at least one element selected from the group consisting of Cl, Br and I; and a, x, y and z are numbers satisfying the conditions of $0.5 \leqq a \leqq 1.25$, $0 \leqq x \leqq 1$, $10^{-6} \leqq y \leqq 2 \times 10^{-1}$, and $0 \leqq z \leqq 2 \times 10^{-1}$, respectively;

$(Ba_{1-x},M^{II}_x)F_2.aBaX_2:yEu,zA$, in which $M^{II}$ is at least one element selected from the group consisting of Be, Mg, Ca, Sr, Zn and Cd; X is at least one element selected from the group consisting of Cl, Br and I; A is at least one element selected from the group consisting of As and Si; and a, x, y and z are numbers satisfying the conditions of $0.5 \leqq a \leqq 1.25$, $0 \leqq x \leqq 1$, $10^{-6} \leqq y \leqq 2 \times 10^{-1}$, and $0 < z \leqq 5 \times 10^{-1}$, respectively;

$M^{III}OX:xCe$, in which $M^{III}$ is at least one trivalent metal selected from the group consisting of Pr, Nd, Pm, Sm, Eu, Tb, Dy, Ho, Er, Tm, Yb, and Bi; X is at least one element selected from the group consisting of Cl and Br; and x is a number satisfying the condition of $0 < x < 0.1$;

$Ba_{1-x}M_{x/2}L_{x/2}FX:yEu^{2+}$, in which M is at least one alkali metal selected from the group consisting of Li, Na, K, Rb and Cs; L is at least one trivalent metal selected from the group consisting of Sc, Y, La, Ce, Pr, Nd, Pm, Sm, Gd, Tb, Dy, Ho, Er, Tm, Yb, Lu, Al, Ga, In and Tl; X is at least one halogen selected from the group consisting of Cl, Br and I; and x and y are numbers satisfying the conditions of $10^{-2} \leqq x \leqq 0.5$ and $0 < y \leqq 0.1$, respectively;

$BaFX.xA:yEu^{2+}$, in which X is at least one halogen selected from the group consisting of Cl, Br and I; A is at least one fired product of a tetrafluoroboric acid compound; and x and y are numbers satisfying the conditions of $10^{-6} \leqq x \leqq 0.1$ and $0 < y \leqq 0.1$, respectively;

$BaFX.xA:yEu^{2+}$, in which X is at least one halogen selected from the group consisting of Cl, Br and I; A is at least one fired product of a hexafluoro compound selected from the group consisting of monovalent and divalent metal salts of hexafluoro silicic acid, hexafluoro titanic acid and hexafluoro zirconic acid; and x and y are numbers satisfying the conditions of $10^{-6} \leqq x \leqq 0.1$ and $0 \leqq y \leqq 0.1$, respectively;

$BaFX.xNaX':aEu^{2+}$, in which each of X and X' is at least one halogen selected from the group consisting of Cl, Br and I; and x and a are numbers satisfying the conditions of $0 < x \leqq 2$ and $0 < a \leqq 0.2$, respectively;

$M^{II}FX.xNaX':yEu^{2+}:zA$, in which $M^{II}$ is at least one alkaline earth metal selected from the group consisting of Ba, Sr and Ca; each of X and X' is at least one halogen selected from the group consisting of Cl, Br and I; A is at least one transition metal selected from the group consisting of V, Cr, Mn, Fe, Co and Ni; and x, y and z are numbers satisfying the conditions of $0<x\leq 2$, $0<y\leq 0.2$ and $0<z\leq 10^{-2}$, respectively;

$M^{II}FX.aM^{I}X'.bM'^{II}X''_2.cM^{III}X'''_3.xA:yEu^{2+}$, in which $M^{II}$ is at least one alkaline earth metal selected from the group consisting of Ba, Sr and Ca; $M^{I}$ is at least one alkali metal selected from the group consisting of Li, Na, K, Rb and Cs; $M'^{II}$ is at least one divalent metal selected from the group consisting of Be and Mg; $M^{III}$ is at least one trivalent metal selected from the group consisting of Al, Ga, In and Tl; A is at least one metal oxide; X is at least one halogen selected from the group consisting of Cl, Br and I; each of X', X'' and X''' is at least one halogen selected from the group consisting of F, Cl, Br and I; a, b and c are numbers satisfying the conditions of $0\leq a\leq 2$, $0\leq b\leq 10^{-2}$, $0\leq c\leq 10^{-2}$ and $a+b+c\leq 10^{-6}$; and x and y are numbers satisfying the conditions of $0<x\leq 0.5$ and $0<y\leq 0.2$, respectively;

$M^{II}X_2.aM^{II}X'_2:xEu^{2+}$, in which $M^{II}$ is at least one alkaline earth metal selected from the group consisting of Ba, Sr and Ca; each of X and X' is at least one halogen selected from the group consisting of Cl, Br and I, and $X\neq X'$; and a and x are numbers satisfying the conditions of $0.1\leq a\leq 10.0$ and $0<x\leq 0.2$, respectively;

$M^{II}FX.aM^{I}X':xEu^{2+}$, in which $M^{II}$ is at least one alkaline earth metal selected from the group consisting of Ba, Sr and Ca; $M^{I}$ is at least one alkali metal selected from the group consisting of Rb and Cs; X is at least one halogen selected from the group consisting of Cl, Br and I; X' is at least one halogen selected from the group consisting of F, Cl, Br and I; and a and x are numbers satisfying the conditions of $0<a\leq 4.0$ and $0<x\leq 0.2$, respectively;

$M^{I}X:xBi$, in which $M^{I}$ is at least one alkali metal selected from the group consisting of Rb and Cs; X is at least one halogen selected from the group consisting of Cl, Br and I; and x is a number satisfying the condition of $0<x\leq 0.2$; and LnOX:xCe (wherein Ln is at least one selected from the group consisting of La, Y, Gd and Lu, X is at least one selected from the group of Cl, Br and I, x satisfies the condition of $0<x\leq 0.2$, atomic ratio of X/L satisfies the condition of $0.500<X/L\leq 0.998$, and the maximum wavelength λ of spectrum of stimulating rays for the phosphor satisfies the condition of 550 nm$<\lambda<$700 nm).

The above-mentioned $M^{II}X_2.aM^{II}X'_2:xEu^{2+}$ phosphor may further contain the following additives:

$bM^{I}X''$, in which $M^{I}$ is at least one alkali metal selected from the group consisting of Rb and Cs; X'' is at least one halogen selected from the group consisting of F, Cl, Br and I; and b is a number satisfying the condition of $0<b\leq 10.0$;

$bKX''.cMgX'''_2.dM^{III}X''''_3$, in which $M^{III}$ is at least one trivalent metal selected from the group consisting of Sc, Y, La, Gd and Lu; each of X'', X''' and X'''' is at least one halogen selected from the group consisting of F, Cl, Br and I; and b, c and d are numbers satisfying the conditions of $0\leq b\leq 2.0$, $0\leq c\leq 2.0$ and $0\leq d\leq 2.0$, and $2\times 10^{-5}\leq b+c+d$;

bA, in which A is at least one oxide selected from the group consisting of $SiO_2$ and $P_2O_5$; and b is a number satisfying the condition of $10^{-4}\leq b\leq 2\times 10^{-1}$;

yB, in which y is a number satisfying the condition of $2\times 10^{-4}\leq b\leq 2\times 10^{-1}$;

bSiO, in which b is a number satisfying the condition of $0<b\leq 3\times 10^{-2}$;

$bSnX''_2$, in which X'' is at least one halogen selected from the group consisting of F, Cl, Br and I; and b is a number satisfying the condition of $0<b\leq 10^{-3}$;

$bCsX''.cSnX'''_2$, in which each of X'' and X''' is at least one halogen selected from the group consisting of F, Cl, Br and I; and b and c are numbers satisfying the conditions of $0<b\leq 10.0$ and $10^{-6}\leq c\leq 2\times 10^{-2}$, respectively; and $bCsX''.yLn^{3+}$, in which X'' is at least one halogen selected from the group consisting of F, Cl, Br and I; Ln is at least one rare earth element selected from the group consisting of Sc, Y, Ce, Pr, Nd, Sm, Gd, Tb, Dy, Ho, Er, Tm, Yb and Lu; and b and y are numbers satisfying the conditions of $0<b\leq 10.0$ and $10^{-6}\leq y\leq 1.8\times 10^{-1}$, respectively.

Among the above-described stimulable phosphors, the divalent europium activated alkaline earth metal halide phosphor and the cerium activated rare earth metal oxyhalide phosphor are particularly preferred, because these phosphors show stimulated emission of high luminance.

The above-described stimulable phosphors are by no means given to restrict the stimulable phosphors employable in the present invention, and any other phosphors can be also employed, provided that the phosphor gives stimulated emission when excited with stimulating rays after exposure to a radiation.

As the phosphor layer of the radiation image storage panel of the invention, there can be used various types of phosphor layers such as a phosphor layer comprising a binder and a stimulable phosphor dispersed therein, a phosphor layer composed of only an agglomerate of a stimulable phosphor containing no binder, or a phosphor layer of stimulable phosphor agglomerate of which voides are impregnated with a polymer material.

A process for the preparation of the radiation image storage panel of the invention will be described hereinafter, by referring to a radiation image storage panel of which phosphor layer comprises a binder and a stimulable phosphor dispersed therein.

The phosphor layer can be formed on a support, for example, by the following process.

In the first place, a stimulable phosphor and a binder are added to an appropriate solvent, and they are well mixed to prepare a dispersion (coating dispersion for formation of a phosphor layer) in which the phosphor particles are uniformly dispersed in a binder solution.

A ratio between the binder and the stimulable phosphor in the coating dispersion is determined according to characteristics of the desired radiation image storage panel and nature of the phosphor employed. Generally, the ratio is within the range of from 1:1 to 1:100 (binder:phosphor, by weight), preferably from 1:8 to 1:40.

In the second place, the coating dispersion containing the stimulable phosphor and binder prepared as above is evenly coated on one surface of a support to form a layer of the coating dispersion. The coating procedure can be carried out by a conventional coating method such as a method of using a doctor blade, a roll coater or a knife coater.

A support material employable for the radiation image storage panel of the invention can be selected from those used in the known radiation image storage panels.

In known radiation image storage panels, one or more additional layers are optionally placed between the support and the phosphor layer, so as to enhance the adhesion between the support and the phosphor layer, or to improve the sensitivity of the radiation image storage panel or the quality of an image (sharpness and graininess) provided thereby. For example, a subbing layer or an adhesive layer may be provided by coating a polymer material such as gelatin over the surface of the support on the phosphor layer side. Further, a light-reflecting layer or a light-absorbing layer may be placed by forming a polymer material layer containing a light-reflecting material such as titanium dioxide or a light-absorbing material such as carbon black. In the radiation image storage panel of the invention, one or more those additional layers may be provided, and the constitution thereof can be optionally selected depending upon the purpose of the radiation image storage panel.

Further, as described in U.S. Pat. No. 4,575,635, the phosphor layer-side surface of the support (or the surface of an adhesive layer, light-reflecting layer, or light-absorbing layer in the case that such layers are provided on the phosphor layer) can be provided with protruded and depressed portions for enhancement of the sharpness of the resulting radiation image.

After the coating dispersion is coated on the support, the coated dispersion layer is dried to complete the formation of a phosphor layer. The thickness of the phosphor layer varies depending upon characteristics of the desired radiation image storage panel, nature of the phosphor layer, the binder-phosphor ratio, etc. Generally, thickness of the phosphor layer is within the range of 20 $\mu m$ to 1 mm, preferably 50 to 500 $\mu m$.

The phosphor layer can be formed on the support by the methods other than that given in the above. For example, the phosphor layer is once prepared on a sheet (false support) such as a glass plate, a metal plate or a plastic sheet using the aforementioned coating dispersion and then thus prepared phosphor layer is peeled off and overlaid on the genuine support by pressing or using an adhesive agent.

On the phosphor layer of the radiation image storage panel of the invention is placed a protective film which is produced from a film-forming resin and an oligomer having a polysiloxane skeleton or a perfluoroalkyl group, that is a characteristic requisite of the invention. The protective film is described below.

The protective film can be formed on the phosphor layer by evenly coating a solution for the formation of a protective film comprising a film-forming resin and an oligomer having a polysiloxane skeleton and/or a perfluoroalkyl group over the surface of the phosphor layer using a known coating means such as a doctor blade, and drying the coated layer. The protective film can be also formed simultaneously with forming the phosphor layer through simultaneous superposition coating.

Examples of the film-forming resin include known resin materials for the formation of a protective film such as polyurethane resins, polyacrylic resins, cellulose derivatives, polymethyl methacrylate, polyester resins, epoxy resins and fluorocarbon resins. Most preferred film-forming resins are fluorocarbon resins, particularly fluorocarbon resins which are soluble in an organic solvent. The fluorocarbon resins are homopolymers of fluorine atom-containing olefins (i.e., fluoroolefins) or copolymers of fluoroolefins and copolymerizable monomers. Examples of the fluorocarbon resins include polytetrafluoroethylene, polychlorotrifluoroethylene, polyvinyl fluoride, polyvinylidene fluoride, tetrafluoroethylene-hexafluoropropylene copolymer, and fluoroolefin-vinyl ether copolymer.

Most fluorocarbon resins are insoluble in onganic solvents. However, copolymers of the fluoroolefins and copolymerizable monomers can be made well soluble in certain organic solvents, if appropriate copolymerizable monomers are chosen. If such well soluble fluorocarbon resin is used, a coating solution can be easily prepared by dissolving it in an appropriate organic solvent. The coating solution is then coated on the phosphor layer and dried to readily give a protective film. Representative examples of such copolymer are fluoroolefin-vinyl ether copolymers. Further, since polytetrafluoroethylene and its modified polymers are soluble in appropriate fluorine atom-containing organic solvents such as perfluoro-type solvents, these polymers are also easily treated to give a coated protective film.

The protective film of the radiation image storage panel of the invention can contain additives such as cross-linking agents, hardening agents and anti-yellowing agents. In order to increase strength and durability of the protective resin film, the protective film containing a fluorocarbon resin is preferably cross-linked.

An example of the oligomer having polysiloxane skeleton is an oligomer which has dimethylpolysiloxane skeleton and moreover preferably has at least one functional group such as hydroxyl group. The molecular weight (weight average) of the oligomer preferably ranges from 500 to 100,000, more preferably ranges from 1,000 to 100,000, and most preferably ranges from 3,000 to 10,000.

The oligomer having a perfluoroalkyl group (e.g., tetrafluoroethylene group) preferably has at least one functional group such as hydroxyl group. The molecular weight (weight average) preferably ranges from 500 to 100,000, more preferably ranges from 1,000 to 100,000, and most preferably ranges from 10,000 to 100,000.

If the oligomer having the functional group is used, cross-linking reaction takes place between the oligomer and the film-forming resin in the course of the formation of the protective film. By the cross-linking reaction, the oligomer is incorporated into the molecular structure of the film-forming resin. Therefore, the oligomer does not liberate from the protective film even in the course of repeated use of the radiation image storage panel or when the surface of the protective film is subjected to cleaning procedure, and effect of the addition of the oligomer into the protective film is kept for a long time of period. For this reason, the use of an oligomer having a functional group is advantageous.

The oligomer is preferably incorporated into the protective film in an amount of 0.01 to 10 wt. %. Most preferred range is 0.1 to 3 wt. %.

The protective film can further contain a particulate resin of perfluoroolefin or silicone. The particulate resin of perfluoroolefin or silicone preferably has a mean particle size of 0.1 to 10 $\mu m$. Most preferred range of the mean particle size is 0.3 to 5 $\mu m$. The particulate resin is preferably contained in the protective film in an amount of 0.5 to 30 wt. % per the weight of the protective film. Most preferred range is 2 to 20 wt. %, particularly 5 to 15 wt. %.

The particulate resin of perfluoroolefin or slicone can be incorporated into the protective film independently of the oligomer having a polysiloxane skeleton or a perfluoroalkyl group. However, in that case, the protective film should be produced by coating on the phosphor layer a mixture of a film-forming resin composition containing a fluorocarbon resin which is soluble in an organic solvent. The coating can be done in the manner as described in hereinbefore. Examples of the fluorcarbon resin soluble in an organic solvent are described hereinbefore. The particulate resin is preferably contained in the protective film in an amount of 0.5 to 30 wt. % per the weight of the protective film. Most preferred range is 2 to 20 wt. %, particularly 5 to 15 wt. %.

The protective film or at least one of other layers of the radiation image storage panel of the invention can be colored using a coloring material which absorbes a portion of stimulating rays but absorbes almost no stimulated emission so as to improve sharpness of the resulting image, as described in Japanese Patent Publication No. 54(1979)-23400.

Examples of the present invention and comparison examples are given below.

EXAMPLE 1

As materials for the formation of a phosphor layer, 600 g of a stimulable phosphor ($BaFBr_{0.8}I_{0.2}$:0.001$Eu^{2+}$), 15.8 g of a polyurethane resin (Desmolac 4125, trade name, Sumitomo Bayer Urethane Co., Ltd.) and 2.0 g of an epoxy resin of bisphenol A type were added to a mixture solvent of methyl ethyl ketone and toluene (methyl ethyl ketone:toluene=1:1), and they were mixed using a propeller mixer to prepare a coating dispersion for the formation of a phosphor layer having a viscosity of 25 to 30 PS.

The coating dispersion was coated over a support having been provided with an undercoating layer using a doctor blade, and then the coated dispersion was dried at 100° C. for 15 minutes to form a phosphor layer on the support.

Independently, as materials for the formation of a protective film, 70 g of fluoroolefin-vinyl ether copolymer (fluorocarbon resin, Lumifron LF100, trade name, Asahi Glass Co., Ltd.), 25 g of isocyanate (crosslinking agent, Desmodule Z4370, trade name, Sumitomo Bayer Urethane Co., Ltd.), 5 g of an epoxy resin of bisphenol A type, and 0.5 g of an alcohol-modified silicone oligomer (having dimethylpolysiloxane skeleton and further having hydroxyl groups (carbinol groups) in both terminals, X-22-2809, tradename, Sin-Etsu Chemical Industry Co., Ltd.) were added to a mixture solvent of toluene and isopropyl alcohol (toluene:isopropyl alcohol=1:1), to prepare a coating solution for formation of a protective film.

The coating solution was coated on the previously prepared phosphor layer using a doctor blade, and the coated solution was then dried and thermoset at 120° C. for 30 minutes to form a protective film having a thickness of 10 μm on the phosphor layer.

Thus, a radiation image storage panel of the present invention was prepared.

EXAMPLE 2

The procedure of Example 1 was repeated except for replacing the alcohol-modified silicone oligomer with a polyhydroxyperfluoroalkyl group-containing oligomer (DEFENSA.MCF-323, trade name, Dainippon Ink & Chemicals, Inc.) to prepare a radiation image storage panel of the invention.

COMPARISON EXAMPLE 1

The procedure of Example 1 was repeated except for using no alcohol-modified silicone oligomer to prepare a radiation image storage panel of prior art.

COMPARISON EXAMPLE 2

The procedure of Example 1 was repeated except that the protective film was produced from a coating solution of 50 g of fluoroolefin-vinyl ether copolymer (fluorocarbon resin, Lumifron LF504X, trade name, Asahi Glass Co., Ltd.) and 9 g of an isocyanate solution (cross-linking agent, Olester NP-38-70S, trade name, Mitsui-Toatsu Chemical Co., Ltd., 70 wt. % solution in ethyl acetate) in methyl ethyl ketone to prepare a radiation image storage panel of prior art.

Evaluation of Radiation Image Storage Panel

Test 1 (coefficient of friction)

The coefficient of friction on the surface of the protective film of each of the radiation image storage panels obtained in Examples 1 and 2 and Comparison Examples 1 and 2 was measured by the following method.

The radiation image storage panel was cut to give a square piece (2 cm×2 cm, test sample). The test sample was placed on an polyethylene terephtharate sheet under the condition that the protective film faced downward. On the test sample was placed a weight to set a total weight of the test sample and weight to 100 g. The test sample having the weight thereon was slided at a speed of 4 cm/min on the surface of the sheet, at 25° C. and 60% RH, using Tensilon (UTM-11-20, tradename of Toyo Boldwin, Co., Ltd.), to measure a tensile force F (g) under the moving condition. From the measured tensile force F and the above-mentioned weight (100 g), the coefficient of friction on the surface of the protective film of the tested radiation image storage panel sample was calculated using the equation of tensile force/weight. The results are set forth in Table 1.

Test 2 (resistance to abrasion)

The resistance to abrasion on the surface of the protective film of each of the radiation image storage panels obtained in Examples 1 and 2 and Comparison Examples 1 and 2 was measured by the following method.

The radiation image storage panel was cut to give a rectangular sheet (25.2 cm×30.3 cm, test sample). The test sample was placed on an polyethylene terephtharate sheet (made of the same material as the material of the support of the radiation image storage panel) under the condition that the protective film faced downward. The test sample was then slided repeatedly up to 1,000 times back and forth within the path of 10 cm. After the sliding operation between the protective film and the polyethylene terephthalate sheet was complete, the surface of the protective film was observed for evaluation. The evaluation was made to classify the conditions of the surface into the following three groups:

A: Almost no abrasions are observed.

B: Some abrasions are observed, but no problems would occur in the practical use.

C: Many abrasions are observed.

The results are set forth in Table 1.

TABLE 1

| | Coefficient of Friction | Resistance to Abrasion |
|---|---|---|
| Example 1 | 0.32 | A |
| Example 2 | 0.47 | A |
| Comparison Example 1 | 0.80 | C |
| Comparison Example 2 | 0.85 | C |

As is evident from the results set forth in Table 1, the surfaces of the protective films of the radiation image storage panels according to the invention show low coefficient of friction as well asl high resistance to abrasion.

EXAMPLE 3

As materials for the formation of a phosphor layer, 600 g of a stimulable phosphor ($BaFBr_{0.8}I_{0.2}$:0.001$Eu^{2+}$), 15.8 g of a polyurethane resin (Desmolac 4125, trade name, Sumitomo Bayer Urethane Co., Ltd.) and 2.0 g of an epoxy resin of bisphenol A type were added to a mixture solvent of methyl ethyl ketone and toluene (methyl ethyl ketone:toluene=1:1), and they were mixed using a propeller mixer to prepare a coating dispersion for the formation of a phosphor layer having a viscosity of 25 to 30 PS.

The coating dispersion was coated over a support having been provided with an undercoating layer using a doctor blade, and then the coated dispersion was dried at 100° C. for 15 minutes to form a phosphor layer on the support.

Independently, as materials for the formation of a protective film, 70 g of fluoroolefin-vinyl ether copolymer (fluorocarbon resin, Lumifron LF100, trade name, Asahi Glass Co., Ltd.), 25 g of isocyanate (crosslinking agent, Desmodule Z4370, trade name, Sumitomo Bayer Urethane Co., Ltd.), 5 g of an epoxy resin of bisphenol A type, and 10 g of a silicone resin powder (KMP-590, trade name, Shin-Etsu Chemical Industries, Co., Ltd., mean particle size:1-2 μm) were added to a mixture solvent of toluene and isopropyl alcohol (toluene:isopropyl alcohol=1:1), to prepare a coating solution for formation of a protective film.

The coating solution was coated on the previously prepared phosphor layer using a doctor blade, and the coated solution was then dried and thermoset at 120° C. for 30 minutes to form a protective film having a thickness of 10 μm on the phosphor layer.

Thus, a radiation image storage panel of the present invention was prepared.

EXAMPLE 4

The procedure of Example 3 was repeated except for replacing the silicone resin powder with a polytetrafluoroethylene resin powder (Lubron L-2, trade name, Daikin Co., Ltd., primary particle size: 0.3 μm, secondary particle size: 5 μm) to prepare a radiation image storage panel of the invention.

COMPARISON EXAMPLE 3

The procedure of Example 3 was repeated except for using no silicone powder to prepare a radiation image storage panel of prior art.

COMPARISON EXAMPLE 4

The procedure of Example 3 was repeated except that the protective film was produced from a coating solution of 50 g of fluoroolefin-vinyl ether copolymer (fluorocarbon resin, Lumifron LF504X, trade name, Asahi Glass Co., Ltd.) and 9 g of an isocyanate solution (cross-linking agent, Olester NP-38-70S, trade name, Mitsui-Toatsu Chemical Co., Ltd., 70 wt. % solution in ethyl acetate) in methyl ethyl ketone to prepare a radiation image storage panel of prior art.

Evaluation of Radiation Image Storage Panel

The coefficient of friction and resistance to abrasion on the surface of the protective film of each of the radiation image storage panels obtained in Examples 3 and 4 and Comparison Examples 3 and 4 were measured by the aforementioned methods. The results are set forth in Table 2.

TABLE 2

| | Coefficient of Friction | Resistance to Abrasion |
|---|---|---|
| Example 3 | 0.48 | A |
| Example 4 | 0.50 | A |
| Comparison Example 3 | 0.80 | C |
| Comparison Example 4 | 0.85 | C |

As is evident from the results set forth in Table 2, the surfaces of the protective films of the radiation image storage panels according to the invention show low coefficient of friction as well as high resistance to abrasion.

We claim:

1. A radiation image storage panel having a phosphor layer which comprises a stimulable phosphor, and a protective film, wherein the protective film is produced from a film-forming resin and an oligomer having a polysiloxane skeleton or a perfluoroalkyl group.

2. The radiation image storage panel as defined in claim 1, wherein the oligomer is used in an amount of 0.01 to 10 wt. % of weight of the protective film.

3. The radiation image storage panel as defined in claim 1, wherein the oligomer is used in an amount of 0.1 to 3 wt. % of weight of the protective film.

4. The radiation image storage panel as defined in claim 1, wherein the oligomer has at least one hydroxyl group.

5. The radiation image storage panel as defined in claim 1, wherein the film-forming resin is a resin composition containing a fluorcarbon resin which is soluble in an organic solvent.

6. A radiation image storage panel having a phosphor layer which comprises a stimulable phosphor, and a protective film, wherein the protective film is produced by coating on the phosphor layer a mixture of a film-forming resin composition containing a fluorocarbon resin which is soluble in an organic solvent, and a particulate resin of perfluoroolefin or silicone.

* * * * *